United States Patent
Jurt et al.

(10) Patent No.: US 11,812,280 B2
(45) Date of Patent: Nov. 7, 2023

(54) SWARM CONTROL ALGORITHM TO MAINTAIN MESH CONNECTIVITY WHILE ASSESSING AND OPTIMIZING AREAL COVERAGE IN UNKNOWN COMPLEX ENVIRONMENTS

(71) Applicant: Kabushiki Kaisha Toshiba, Tokyo (JP)

(72) Inventors: Marius Jurt, Bristol (GB); Anthony Portelli, Bristol (GB); Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 249 days.

(21) Appl. No.: 17/335,348

(22) Filed: Jun. 1, 2021

(65) Prior Publication Data

US 2022/0386138 A1 Dec. 1, 2022

(51) Int. Cl.
*H04W 84/00* (2009.01)
*H04W 40/24* (2009.01)
(Continued)

(52) U.S. Cl.
CPC ........ *H04W 16/26* (2013.01); *H04B 7/18506* (2013.01); *H04W 40/246* (2013.01); *H04W 84/005* (2013.01)

(58) Field of Classification Search
CPC . H04W 16/26; H04W 40/246; H04W 84/005; H04B 7/18506; G01S 5/0289
See application file for complete search history.

(56) References Cited

U.S. PATENT DOCUMENTS

| | | | |
|---|---|---|---|
| 9,760,088 B2 * | 9/2017 | Baroudi | G05D 1/0287 |
| 2016/0063893 A1 * | 3/2016 | Kanuganti | H04N 21/8545 |
| | | | 348/62 |
| 2018/0333855 A1 | 11/2018 | Moses et al. | |

FOREIGN PATENT DOCUMENTS

| | | |
|---|---|---|
| JP | 2017-519279 A | 7/2017 |
| JP | 2019-020992 A | 2/2019 |

(Continued)

OTHER PUBLICATIONS

Wang et al., Walk, Stop, Count, and Swap: Decentralized Multi-Agent Path Finding With Theoretical Guarantees, IEEE Robotics and Automation Letters, vol. 5, No. 2, Apr. 2020, p. 1120 (Year: 2020).*

(Continued)

*Primary Examiner* — Ashley Shivers
(74) *Attorney, Agent, or Firm* — Oblon, McClelland, Maier & Neustadt, L.L.P.

(57) ABSTRACT

A method for controlling the position of an updating agent in a decentralised multi-agent system, the method comprising: identifying a first neighbouring agent within a communicative range of the updating agent; estimating a first distance to the first neighbouring agent and a first direction to the first neighbouring agent; determining a movement direction based on the first direction to the first neighbouring agent; and determining a movement magnitude based on an activation function, the first distance to the first neighbouring agent, and a desired reference distance. The activation function is configured such that the greater the difference between the first distance to the neighbouring agent and the desired reference difference, the larger the movement magnitude. The method further comprises moving the updating agent based on the movement direction and the movement magnitude.

20 Claims, 8 Drawing Sheets

(51) Int. Cl.
 H04W 16/26 (2009.01)
 H04B 7/185 (2006.01)

(56) References Cited

FOREIGN PATENT DOCUMENTS

| | | |
|---|---|---|
| JP | 2020-530673 A | 10/2020 |
| JP | 2021-506607 A | 2/2021 |
| JP | 7255676 B2 | 4/2023 |

OTHER PUBLICATIONS

J. Zhou, Adversarial Swarm Defense with Decentralized Swarms, May 14, 2021, Electrical Engineering and Computer Sciences University of California, Berkeley, p. 11 (Year: 2021).*

Allen et al., "Designing and Deploying a Rural Ad-Hoc Community Mesh Network Testbed", The IEEE Conference on Local Computer Networks 30th Anniversary (LCN'05), 2005, 4 pages, doi: 10.1109/LCN.2005.51.

Spears, et al., "An Overview of Physicomimetics", 2005, 16 pages.

Engebraaten et al., "A Framework for Automatic Behavior Generation in Multi-Function Swarms", 2020, 25 pages, arXiv preprint arXiv:2007.08656.

Razafindralambo et al., "Connectivity Preservation and Coverage Schemes for Wireless Sensor Networks", IEEE Transactions on Automatic Control, vol. 56, No. 10, Oct. 2011, 11 pages, doi: 10.1109/TAC.2011.2163885.

Natalizio et al., "Optimal Placement of Wireless Nodes for Maximizing Path Lifetime", IEEE Communications Letters, vol. 12, No. 5, May 2008, 4 pages, doi: 10.1109/LCOMM.2008.080168.

Wang et al., "Trade-offs Between Mobility and Density for Coverage in Wireless Sensor Networks", Proceedings of the 13th annual ACM International conference on Mobile Computing and Networking (MobiCom '07), Association for Computing Machinery, 2007, 12 pages, DOI: https://doi.org/10.1145/1287853.1287860.

Chatzigiannakis et al., "Sink Mobility Protocols for Data Collection in Wireless Sensor Networks", Proceedings of the 4th ACM International Workshop on Mobility Management and Wireless Access (MobiWac '06), Association for Computing Machinery, 2006, 8 pages, DOI: https://doi.org/10.1145/1164783.1164793.

Batalin et al., "Coverage, Exploration and Deployment by a Mobile Robot and Communication Network", Proceedings of the International Workshop on Information Processing in Sensor Networks, Apr. 2003, 17 pages, https://doi.org/10.1023/B:TELS.0000029038.31947.d1.

Miranda et al., "Adaptive Deployment Scheme for Mobile Relays in Substitution Networks", International Journal of Distributed Sensor Networks, 2012, 9 pages, doi: 10.1155/2012/128904.

Francesca et al., "AutoMoDe: A novel approach to the automatic design of control software for robot swarms", Swarm Intell 8, 2014, 24 pages, https://doi.org/10.1007/s11721-014-0092-4.

Jones et al., "Evolving Behaviour Trees for Swarm Robotics", Distributed Autonomous Robotic Systems, 2018, 15 pages.

Office Action dated Apr. 25, 2023, in Japanese Patent Application No. 2022-035587 w/English-Machine Translation.

* cited by examiner

Criteria 1: min. number of close neighbour agents reached

SWARM CONTROL ALGORITHM TO MAINTAIN MESH CONNECTIVITY WHILE ASSESSING AND OPTIMIZING AREAL COVERAGE IN UNKNOWN COMPLEX ENVIRONMENTS

FIELD

The present disclosure relates to a method and apparatus for controlling the position of an updating agent in a decentralised multi-agent system.

BACKGROUND

Swarm robotics has been the subject of growing interest in recent times. Swarm robotics generally involves the co-ordinated operation of multiple individual agents with the aim of obtaining a desired collective behaviour. In swarm robotics the individual agents are robots. Swarms of robots are typically used for tasks that are too big or too complex to be achieved by a single, more sophisticated robot. Swarms of robots have an increasing number of applications owing to the fact that swarms are generally scalable, robust, and adaptable to changes in their environment. In particular swarm robotics has found use-cases in various industries ranging from logistics, retail, healthcare, construction, agriculture, and mining to disaster support and surveillance. There are generally two approaches to controlling multi-robotic systems, namely centralised control and decentralised control. In centralised control, data from the agents is collected at a central computational unit. This central computational unit is responsible for generating instructions (e.g. movement instructions) that are to be carried out by the various agents. In contrast, decentralised control involves individual agents interacting locally with their neighbours, generating instructions and making decisions. Using decentralised control, a single point of failure can be avoided. This increases robustness and scalability. In swarm robotics, relatively simple agents communicate with their neighbour agents and locally sense their environment. Based on that information, and the control scheme implemented on the robots, the executed actions of all swarm agents can lead to collective behaviours which are beyond the capabilities of a single agent.

Although decentralised control can be more challenging to implement, it has the advantage of being scalable, robust, and adaptable to changes in the environment. Furthermore, the decentralised control algorithms can often be implemented on low-cost robots with limited on-board capabilities. Consequently decentralised control is sometimes preferred. However, when implementing decentralised control of swarms it is important that the local control rules (i.e. the rules executed at each agent) are adequately designed and verified so that the combination of each agent implementing these rules leads to the desired emergent swarm behaviour (e.g. a self-organising swarm of robots).

In many swarm applications, maintaining a communications network in the region of the deployed agents can be desirable since it can increase overall task performance. However, in some cases there is no pre-existing wireless communication infrastructure available to support the communication network. This could happen, for example, when a swarm of agents (e.g. robots) are deployed on a disaster relief mission. In this case existing wireless communications infrastructure could be unavailable.

As a result, there is a need to form and maintain a communications network amongst the deployed agents themselves. Maintaining a communications network amongst the deployed agents can assist in increasing the overall task performance and can also enable other systems, which are not part of the swarm, to communicate with each other through the mesh communication network maintained by the swarm agents. For redundancy and enhanced reliability of the communications network, it is desirable that the agents dynamically place themselves at optimal positions to ensure connectivity amongst the various swarm agents.

Mesh networks are a type of network topology that are particularly suited to providing a reliable communications network. Consequently, it is therefore desirable to create a set of local rules to be implemented by an agent that obtains a mesh network connecting the various swarm agents to each other. Such a mesh network should be achieved without prior knowledge of the environment, network topology or optimal agents' locations in order to ensure the system is scalable and adaptive to changes in the environment.

Another purpose of a swarm of agents is to ensure that there is optimum area coverage. This allows the swarm of agents to cover an area such that it is able to observe or interrogate (e.g. using its on-board sensors) the whole of an area in real-time. For example, a robot agent could include means to locate an object. Achieving optimal area coverage means that when a question is submitted to the swarm of agents (e.g. is the object present in the area), the swarm as a whole is able to provide a correct/truthful/complete answer, since the entire (dynamically changing) environment can be perceived by all agents together in real-time. Real-time in this context means sufficiently fast such that there is no significant or noticeable time delay between the user submitting a question to the swam (e.g. is object xy present in the environment? or how many objects are type z are there?) and the user receiving the answer back from the swarm system.

However, the approaches used to achieve optimum area coverage (e.g. distributing the agents over large areas) are often in conflict with the requirement to maintain a communication network between the agents, which limits the spacing between agents. Previous approaches to swarm robotics have struggled to find an approach that combines an ability to explore an area for improved area coverage, while ensuring connectivity is maintained amongst the swarm agents. In light of this there is a need for a new approach to controlling swarms of agents (e.g. robots) that maintains mesh network connectivity while optimising area coverage in unknown and dynamically changing environments.

Arrangements of embodiments will be understood and appreciated more fully from the following detailed description, made by way of example only and taken in conjunction with drawings in which.

DETAILED DESCRIPTION

According to a first aspect there is provided a method for controlling the position of an updating agent in a decentralised multi-agent system. The method comprises: identifying a first neighbouring agent within a communicative range of the updating agent; estimating a first distance to the first neighbouring agent and a first direction to the first neighbouring agent; determining a movement direction based on the first direction to the first neighbouring agent; and determining a movement magnitude based on an activation function, the first distance to the first neighbouring agent, and a desired reference distance. Wherein the activation function is configured such that the greater the difference between the first distance to the neighbouring agent and the desired reference difference, the larger the movement magnitude. The method further comprising moving the updating agent based on the movement direction and the movement magnitude.

In an embodiment the method further comprises communicating data with the neighbouring agent.

In an embodiment the method further comprises communicating data wirelessly with the neighbouring agent.

In an embodiment the agent is a robot.

In an embodiment the movement magnitude gets larger when, both, the first distance to the neighbouring agent is less than the desired reference distance and when the first reference distance to the neighbouring agent is greater than the desired reference distance.

In an embodiment the decentralised multi-agent system is a swarm of agents.

In an embodiment the desired reference distance is predetermined.

In an embodiment the method further comprises calculating a desired reference distance based on the communicative range of the updating agent.

In an embodiment the activation function is configured to generate a movement magnitude of zero when a difference between the first distance to the neighbouring agent and the desired reference difference is less than a threshold.

In an embodiment the activation function is based on a cubic function.

Figure 11:
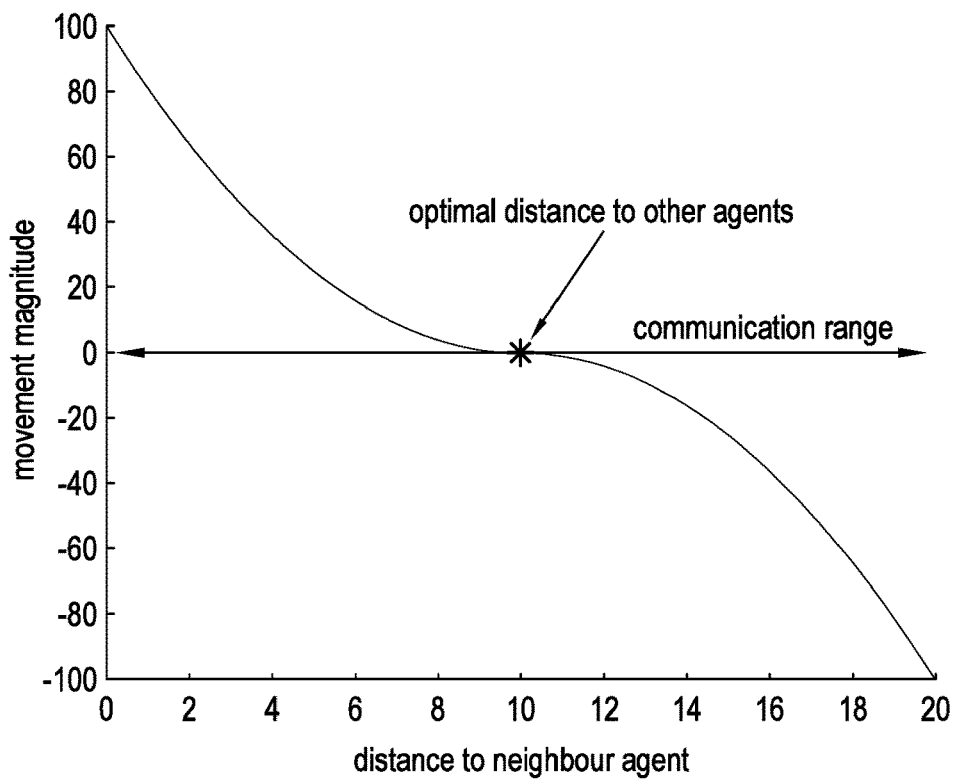
FIG. 11 shows an activation function for determining a movement magnitude according to an example.

In an embodiment the activation function is that shown in FIG. 11.

In an embodiment the method further comprises: identifying a second neighbouring agent within the communicative range of the updating agent; estimating a second distance to the second neighbouring agent and a second direction to the second neighbouring agent; determining whether the first neighbouring agent and the second neighbouring agent are located within the desired reference distance of the updating agent; and in response to determining that the first neighbouring agent is located within the desired reference distance of the updating agent and the second neighbouring agent is not located within the desired reference distance of the updating agent: determining the movement direction based on only the first direction to the first neighbouring agent; and determining the movement magnitude based on the activation function, the desired reference distance, and only the first distance to the first neighbouring agent.

In an embodiment the movement direction is equal to the first direction to the first neighbouring agent and the movement magnitude is negative such that the updating agent moves in the opposite direction of the first direction to the first neighbouring agent.

In an embodiment the method further comprises: determining the movement direction according to a sum of a direction vector to the first neighbouring agent and a direction vector to a second neighbouring agent; determining a first movement magnitude based on the first distance to the neighbouring agent, the activation function and the desired reference distance; determining a second movement magnitude based on the second distance to the second neighbouring agent, the activation function and the desired reference distance; and determining the movement magnitude based on an average of the first movement magnitude and the second movement magnitude, in response to determining that either: the first neighbouring agent and the second neighbouring agent are located within the desired reference distance of the updating agent; or the first neighbouring agent and the second neighbouring agent are not located within the desired reference distance of the updating agent.

In an embodiment the method further comprises determining a communicative range of the updating agent based on a communication between the updating agent and the first neighbouring agent and setting the desired reference distance less than the communicative range.

In an embodiment the method further comprises determining a sensor perception range of a sensor of the updating agent and setting the desired reference distance less than the sensor perception range.

In an embodiment the desired reference distance is a proportion of the communicative range.

In an embodiment the communicative range is half of the desired reference difference.

In an embodiment determining the communicative range further comprises calculating at least one of: Signal-to-Noise Ratio (SNR), Time Difference of Arrival (TDoA), Angle of Arrival (AoA), transmission rate, and round trip time of the communication; and calculating the communicative range based on the calculated value.

According to a second aspect there is provided a method of operating a decentralised multi-agent system deployed within an area, the method comprising: updating a position of an updating agent in the decentralised multi-agent system according to the method of claim 1; determining a local area coverage for each agent in the decentralised multi-agent system; determining whether full areal coverage is achieved by the decentralised multi-agent system based on the local area coverage performed by each agent in the decentralised multi-agent system; and in response to determining that full areal coverage is not achieved by the decentralised multi-agent system: deploying a further agent within the area to be part of the decentralised multi-agent system.

In an embodiment the method further comprises maintaining a mesh network amongst the decentralised multi-agent system.

In an embodiment the method further comprises communicating wirelessly between the agents in the decentralised multi-agent system.

In an embodiment, in response to determining that full areal coverage has been achieved by the decentralised multi-agent system, the method further comprises: determining whether there is an outstanding request to be implemented by the decentralised multi-agent system; and in response to determining that there is an outstanding request: communicating the request between each of the agents in the decentralised multi-agent system using a mesh network maintained by the decentralised multi-agent system; and executing, by each agent in the decentralised multi-agent system, the outstanding request.

In an embodiment, the method further comprises: transmitting, by each agent, a response to the request; relaying, by the decentralised multi-agent system, using the mesh network maintained by the decentralised multi-agent system, the response to the request; and collating, by an agent that issued the outstanding request, responses from each agent; in response to determining that there is an outstanding request.

In an embodiment determining whether full areal coverage is achieved comprises: broadcasting a query to the decentralised multi-agent system; transmitting, by each agent in the decentralised multi-agent system, an indication of whether each agent is locally perceiving a sufficient area; and determining that full areal coverage is achieved in response to receiving an indication that each agent in the decentralised multi-agent system is locally perceiving sufficient area, wherein:
  an agent is locally perceiving sufficient area if there are no blind spots in sensor coverage surrounding an area being perceived by the agent.

In an embodiment an agent is locally perceiving sufficient area if an agent evaluates itself locally able to contribute to an overall full areal coverage (no possible blind spots) and thus contributes to a truthful perception of the dynamically changing environment in real time.

In an embodiment determining the local area coverage for each agent in the decentralised multi-agent system further comprises: determining, by the updating agent, whether the updating agent has identified at least a predetermined number of neighbouring agents; and/or determining, by the updating agent, whether the updating agent is within a predetermined distance of at least one obstacle.

In an embodiment determining the local area coverage for each agent in the decentralised multi-agent system further comprises: determining, by the updating agent, whether the updating agent has identified at least a predetermined number of neighbouring agents; or determining, by the updating agent, whether the updating agent is within a predetermined distance of at least one obstacle.

In an embodiment determining the local area coverage for each agent in the decentralised multi-agent system further comprises: determining, by the updating agent, whether the updating agent has identified at least a predetermined number of neighbouring agents; and determining, by the updating agent, whether the updating agent is within a predetermined distance of at least one obstacle.

In an embodiment determining the local area coverage for each agent in the decentralised multi-agent system further comprises: dividing an area surrounding the updating agent into a first sector and a second sector, wherein the first sector is associated with a first angular distance and the second sector is associated with a second angular distance; and determining that the updating agent is locally perceiving sufficient area in response to determining that: the first sector comprises: a second neighbouring agent; or a first obstacle that spans the first angular distance; and the second sector comprises: a third neighbouring agent; or a second obstacle the spans the second angular distance. Optionally, spans the first angular distance means spans the entire first angular distance.

In an embodiment the first angular distance equals the second angular distance.

In an embodiment determining the local area coverage for each agent in the decentralised multi-agent system further comprises: determining that the updating agent is locally perceiving sufficient area in response to determining that there is an arrangement of the first sector and the second sector in which: the first sector comprises: a second neighbouring agent; or a first obstacle that spans the entire first angular distance; and the second sector comprises: at third neighbouring agent; or a second obstacle the spans the entire second angular distance.

In an embodiment rotating the first sector and the second sector about the sensor.

According to a third aspect there is provided an apparatus for controlling the position of an updating agent in a decentralised multi-agent system. The apparatus configured to: identify a first neighbouring agent within a communicative range of the updating agent; estimate a first distance to the first neighbouring agent and a first direction to the first neighbouring agent; determine a movement direction based on the first direction to the first neighbouring agent; determine a movement magnitude based on an activation function, the first distance to the first neighbouring agent, and the desired reference distance, wherein: the activation function is configured such that the greater the difference between the first distance to the neighbouring agent and a desired reference difference, the larger the movement magnitude; and move the updating agent based on the movement direction and the movement magnitude.

In an embodiment the activation function is configured to generate a movement magnitude of zero when a difference between the first distance to the neighbouring agent and the desired reference difference is less than a threshold.

In an embodiment the apparatus is further configured to: identify a second neighbouring agent within the communicative range of the updating agent; estimate a second distance to the second neighbouring agent and a second direction to the second neighbouring agent; determine whether the first neighbouring agent and the second neighbouring agent are located within the desired reference distance of the updating agent; and in response to determining that the first neighbouring agent is located within the desired reference distance of the updating agent and the second neighbouring agent is not located within the desired reference distance of the updating agent: determine the movement direction based on only the first direction to the first neighbouring agent; and determine the movement magnitude based on the activation function, the desired reference distance, and only the first distance to the first neighbouring agent.

In an embodiment the apparatus is configured to: determine the movement direction according to a sum of a direction vector to the first neighbouring agent and a direction vector to a second neighbouring agent; determine a first movement magnitude based on the first distance to the neighbouring agent, the activation function and the desired reference distance; determine a second movement magnitude based on the second distance to the second neighbouring agent, the activation function and the desired reference distance; and determine the movement magnitude based on an average of the first movement magnitude and the second movement magnitude in response to determining that either: the first neighbouring agent and the second neighbouring agent are located within the desired reference distance of the updating agent; or the first neighbouring agent and the second neighbouring agent are not located within the desired reference distance of the updating agent.

In an embodiment the apparatus is further configured to: determine a communicative range of the updating agent based on a communication between the updating agent and the first neighbouring agent and set the desired reference distance less than the communicative range.

According to a fourth aspect there is provided an agent for operating in a decentralised multi-agent system, the agent comprising the apparatus for controlling the position of an updating agent.

According to a fifth aspect there is provided a system comprising a decentralised multi-agent system deployed within an area, the system configured to: update a position of an updating agent in the decentralised multi-agent system according to the method of claim 1; determine a local area coverage for each agent in the decentralised multi-agent system; determine whether full areal coverage is achieved by the decentralised multi-agent system based on the local area coverage performed by each agent in the decentralised multi-agent system; and in response to determining that full areal coverage is not achieved by the decentralised multi-agent system: deploy a further agent within the area to be part of the decentralised multi-agent system.

In an embodiment the system is further configured, when determining whether full areal coverage is achieved, to: broadcast a query to the decentralised multi-agent system; transmit, by each agent in the decentralised multi-agent system, an indication of whether each agent is locally perceiving a sufficient area; and determine that full areal coverage is achieved in response to receiving an indication that each agent in the swarm is locally perceiving sufficient area, wherein: an agent is locally perceiving sufficient area if there are no blind spots in sensor coverage surrounding an area being perceived by the agent.

In an embodiment the system is further configured, when determining the local area coverage for each agent in the decentralised multi-agent system, to: determine, by the updating agent, whether the updating agent has identified at least a predetermined number of neighbouring agents; and/or determine, by the updating agent, whether the updating agent is within a predetermined distance of at least one obstacle.

In an embodiment the system is further configured, when determining the local area coverage for each agent in the decentralised multi-agent system, to: divide an area surrounding the updating agent into a first sector and a second sector, wherein the first sector is associated with a first angular distance and the second sector is associated with a second angular distance; and determine that the updating agent is locally perceiving sufficient area in response to determining that: the first sector comprises: a second neighbouring agent; or a first obstacle that spans the first angular distance; and the second sector comprises: a third neighbouring agent; or a second obstacle the spans the second angular distance.

In an embodiment the first angular distance equals the second angular distance.

According to a sixth aspect there is provided a non-transitory computer-readable medium comprising computer program instructions suitable for execution by a processor, the instructions configured, when executed by the processor, to: identify a first neighbouring agent within a communicative range of the updating agent; estimate a first distance to the first neighbouring agent and a first direction to the first neighbouring agent; determine a movement direction based on the first direction to the first neighbouring agent; determine a movement magnitude based on an activation function, the first distance to the first neighbouring agent, and a desired reference distance, wherein: the activation function is configured such that the greater the difference between the first distance to the neighbouring agent and the desired reference difference, the larger the movement magnitude; and move the updating agent based on the movement direction and the movement magnitude.

According to a seventh aspect there is provided a method of operating a decentralised multi-agent system deployed within an area, the method comprising: determining a local area coverage for each agent in the decentralised multi-agent system; determining whether full areal coverage is achieved by the decentralised multi-agent system based on the local area coverage performed by each agent in the decentralised multi-agent system; and in response to determining that full areal coverage is not achieved by the decentralised multi-agent system: deploying a further agent within the area to be part of the decentralised multi-agent system.

In an embodiment the method further comprises maintaining a mesh network amongst the decentralised multi-agent system.

In an embodiment the method further comprises communicating wirelessly between the agents in the decentralised multi-agent system.

In an embodiment the method further comprises determining whether full areal coverage is achieved comprises: broadcasting a query to the decentralised multi-agent system; transmitting, by each agent in the decentralised multi-agent system, an indication of whether each agent is locally perceiving a sufficient area; and determining that full areal coverage is achieved in response to receiving an indication that each agent in the swarm is locally perceiving sufficient area.

In an embodiment determining the local area coverage for each agent in the decentralised multi-agent system further comprises: determining, by an updating agent, whether the updating agent has identified at least a predetermined number of neighbouring agents; and/or determining, by the updating agent, whether the updating agent is within a predetermined distance of at least one obstacle.

In an embodiment determining the local area coverage for each agent in the decentralised multi-agent system further comprises: dividing an area surrounding the updating agent into a first sector and a second sector, wherein the first sector is associated with a first angular distance and the second sector is associated with a second angular distance; and determining that the updating agent is locally perceiving sufficient area in response to determining that: the first sector comprises: a first neighbouring agent; or a first obstacle that spans the first angular distance; and the second sector comprises: a second neighbouring agent; or a second obstacle the spans the second angular distance. Optionally, spans the first angular distance means spans the entire first angular distance.

In an embodiment the first angular distance equals the second angular distance.

In an embodiment determining the local area coverage for each agent in the decentralised multi-agent system further comprises: determining that the updating agent is locally perceiving sufficient area in response to determining that there is an arrangement of the first sector and the second sector in which: the first sector comprises: a first neighbouring agent; or a first obstacle that spans the entire first angular distance; and the second sector comprises: a second neighbouring agent; or a second obstacle the spans the entire second angular distance.

In an embodiment the method further comprises rotating the first sector and the second sector about the sensor.

In the following description the arrangements and examples are discussed in relation to a swarm of agents, and in particular to a swarm of robots. However, it will be understood that the techniques described herein are not limited to swarms. Instead the techniques could be used in any decentralised multi-agent system, in particular any decentralised multi-robot system.

Figure 1:
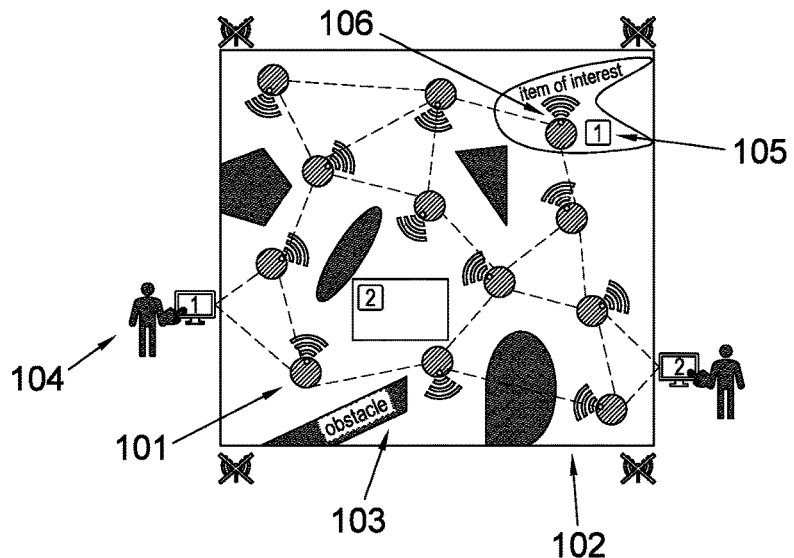
FIG. 1 shows an example of a deployed swarm robot system that has formed a mesh network.

FIG. 1 shows an example of a deployed swarm robot system that has formed a mesh network. In particular FIG. 1 shows an arrangement that has maintained mesh connectivity while optimising its areal coverage. As used herein, the term areal coverage relates to the ability of the swarm of agents (e.g. robots) to perceive an entire environment and allow a user or another system (e.g. a robot) to access and use (from anywhere within the covered environment) the mesh communication network maintained by the swarm robots.

FIG. 1 shows a swarm of robots 101 within a boundary 102. The boundary 102 may be a physical boundary (e.g. a wall) or a virtual boundary (e.g. enforced by location co-ordinates). Wireless radio signals and optical signals could also be used to enforce a virtual boundary. In this case the swarm agents are not required to be aware of, or navigate within, a global coordinate system. Within the boundary 102 there are a plurality of obstacles 103. Each robot 101 is communicatively coupled to at least one other robot in the swarm to form a mesh communications network.

As known in the art, a mesh network is a network topology where each node (e.g. an agent) connects to at least one (but often many) other nodes. In mesh networks communications between any two nodes are relayed network connections and any intervening nodes. Due to the nature of a mesh networks, there is often more than one path that could be used to route communications between two nodes.

The swarm of robots shown in FIG. 1 has achieved optimal areal coverage as the robots are able to observe and/or interact with the complete area within the boundary 102. Furthermore, the swarm has maintained connectivity between the various robots in the arrangement of FIG. 1, thereby ensuring that the communications network created by the robot agents is maintained. As a result, the system as a whole is able to process requests/questions that are put to it concerning the environment in which the agents operate and generate responses to these requests/questions in real time.

For example, in FIG. 1 each robot 101 comprises means to identify an object of interest (e.g. radio identification means, visual identification means, etc.). In this example it is assumed that each robot is aware of its absolute position within a global coordinate system (thereby enabling the position of the object of interest position in the global coordinate system to be deduced). A first user 104 transmits a request to the swarm robot system to locate the position of an object of interest 105. The request is transmitted across the mesh network formed by the robots in the swarm. Each robot in the swarm receives and processes the request. A first robot 106 locates the object of interest 105 using its identification means and transmits a response to the first user 104 indicating the position of the object of interest. By maintaining overall areal coverage within the boundary 102 the swarm is able to ensure that the complete area can be interrogated by the robots. Furthermore, ensuring connectivity is maintained amongst the robots in the swarm facilitates the exchange of communications between the first user 104 and the first robot 106. This is particularly important in the example of FIG. 1 where the existing wireless communication infrastructure is unavailable and in other environments where wireless access points might not exist (e.g. minimal infrastructure systems).

The obstacle 103 could be another type of robot, or a human operating and moving around within the environment. If the environment is dynamically modified (e.g. if the obstacle 103 is moved or the obstacle 103 moves itself) or if the environment is dynamically changed (e.g. by increasing the area enclosed by the boundary 102) then the swarm as a collective must adapt in order to maintain overall areal coverage. In a distributed control system this means that each individual agent must implement local rules to achieve the desired collective behaviour of maintaining overall areal coverage.

Figure 2:
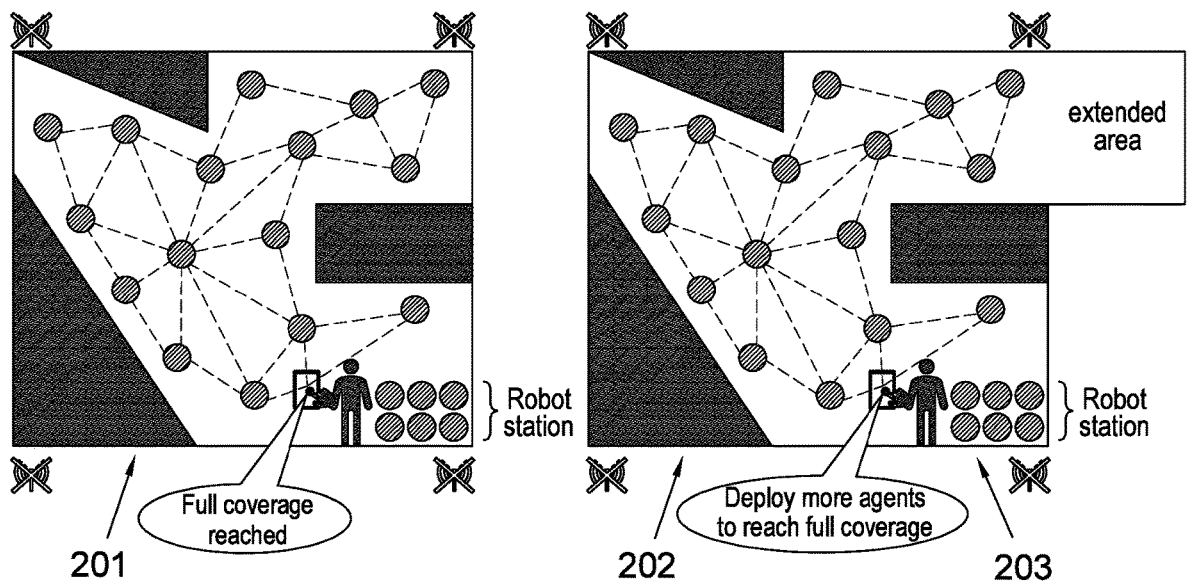
FIG. 2 shows two instances of a deployed swarm of robots.

FIG. 2 shows two instances of a deployed swarm of robots. In particular FIG. 2 shows a first arrangement 201 where the robotic (swarm) agents have arranged themselves to maintain overall areal coverage (i.e. so that the entire area enclosed by the boundary can be observed) while still maintaining communications between the robotic (swarm) agents such that the integrity of the mesh communications network is maintained.

In a second arrangement the size of the environment being monitored is changed to include an extended area. If the arrangement of agents within the swarm is not adapted then the areal coverage will be sub-optimal since the contents of the extended area cannot be observed or interrogated by the robotic (swarm) agents. Likewise, if the number of agents is not adapted then, assuming there was previously no over-density of agents (i.e. there were not more agents deployed in the environment than were necessary to achieve overall areal coverage), the area coverage will be sub-optimal since there would not be enough agents to perceive the extended area.

One way to observe the extended area would be to increase the distance between agents, thereby spreading the agents over a larger area. However increasing the distance between robots of the swarm too far runs the risk that the robots will no longer be in communicative range of each other, thereby jeopardising the integrity and connectivity of the mesh network.

As will become apparent from the embodiment discussed below, to solve this problem additional agents (e.g. robots) are deployed from a robot station 203 to cover and perceive the entire environment. Or in other words, areal coverage is optimised by adding additional agents to the system until the system is able to perceive the entire area. The determination of whether sufficient agents are deployed is taken by the swarm itself. This way, areal coverage is achieved with some final number of agents required to cover and perceive the entire area of unknown size. The areal coverage gets optimised over time. Furthermore, the designed movement scheme (i.e. the local rules on each agent) discussed in more detail below leads to an emergent behaviour of the swarm that maintains connectivity amongst the agents before, during, and after new agents are deployed to achieve optimal areal coverage.

The arising behaviour is therefore a well-distributed cluster of agents that remains connected and grows as additional agents are deployed. The method disclosed herein for optimising areal coverage whilst maintaining connectivity of the mesh network is referred to as 'Areal Coverage Optimising Movement Scheme (ACOMS)'.

Figure 3:
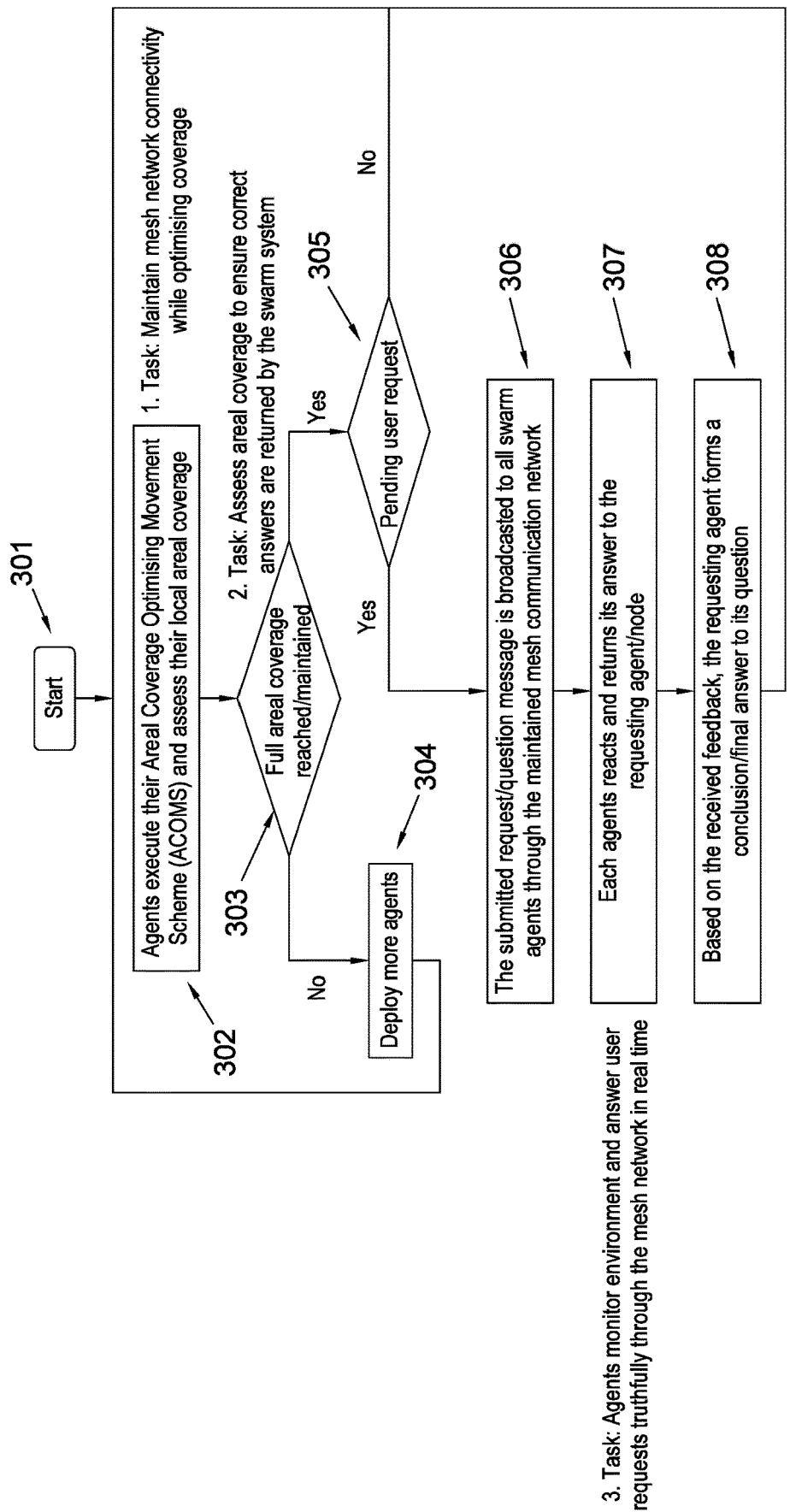
FIG. 3 shows a method involving the use of an Areal Coverage Optimising Movement Scheme according to an example.

FIG. 3 shows a method involving the use of an Areal Coverage Optimising Movement Scheme according to an example. The method starts in 301 and proceeds to step 302. In step 302 each agent (e.g. a robot in a swarm of robots) executes the Areal Coverage Optimising Movement Scheme according to an embodiment and assess their local area coverage.

As will be discussed in more detail below, when executing the Areal Coverage Optimising Movement Scheme each agent individually determines the distance to neighbouring agents (e.g. robots) and determines movement instructions to be performed by the agent that maintains the mesh network (i.e. the communicative link to neighbouring agents) but also optimises areal coverage (i.e. the ability of the swarm to monitor the area of interest). The movement instructions are subsequently carried out by each agent.

After performing the Areal Coverage Optimising Movement Scheme, each agent subsequently asses their local area coverage. During a local areal coverage assessment each agent determines whether the agent is locally perceiving sufficient area. The term "locally perceiving sufficient area" is used in the following manner. An area that an agent can perceive (e.g. interrogate with its sensors) does not generally change unless there are obstacles. Determining whether an agent is locally perceiving sufficient area is equivalent to checking whether there are any "blind spots" surrounding an area being perceived by an agent. In this context a "blind spot" is an area that cannot be interrogated any of the deployed agents (e.g. in particular using a sensor of any of the deployed agents).

Figure 4:
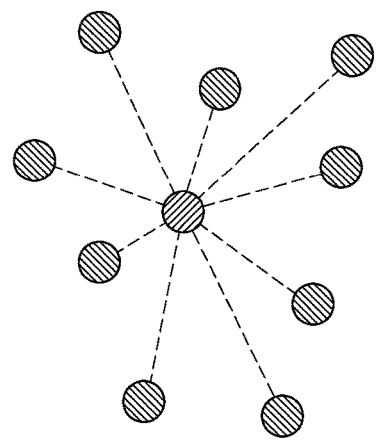
FIG. 4 shows a first criteria used to determine whether each agent is locally perceiving a sufficient area according to an example.

FIG. 4 shows a first criteria used to determine whether each agent is locally perceiving a sufficient area according to an example. A first criteria used by each agent to determine whether the agent is perceiving a sufficient area is whether the agent is surrounded by a minimum number of neighbouring nodes.

When using the first criteria an agent evaluates whether it is has identified at least a predetermined number of agents within the communicative range of the updating agent. The predetermined number of agents required for the agent to determine that it is perceiving a sufficient area could be any number equal to or greater than one. Information about the neighbouring agents (i.e. which agents are within the communicative range of the updating agent) is obtained when the updating agent transmits a communication to identify neighbouring agent. This communication prompts all those agents that receive the communication to respond. From the responses the updating agent is able to determine the number of neighbouring agents, and compare this number to a predetermined number of agents required for the updating agent to conclude that it is perceiving a sufficient area.

Alternatively, or additionally the agents may identify neighbouring agents using sensors (such as optical sensors) comprised by said agent.

For the avoidance of doubt it is noted that determining whether an updating agent is associated with at least a predetermined number of neighbouring agents is equivalent to determining whether the updating agent is within a threshold distance of a predetermine number of neighbouring agents, that threshold being the communicative range. In other examples, the threshold distance for determining whether there is a sufficient local area coverage may be different to the communicative range. For example, the distance may be a proportion of the communicative range, e.g. half of the communicative range. The distance may be predetermined, e.g. 0.6 metres. Or the distance may depend on another factor, such as a range of sensor equipment on the deployed agent.

The predetermined number of neighbouring agents that are required for an updating agent to be locally perceiving a sufficient area can depend on the sensor perception range of each of the neighbouring agents. Optionally the predetermined number of neighbouring agents that are required in order for an updating agent to be locally perceiving a sufficient area can depend on the sensor perception range of neighbouring agents relative to the communication range of the updating agent.

Figure 5A:
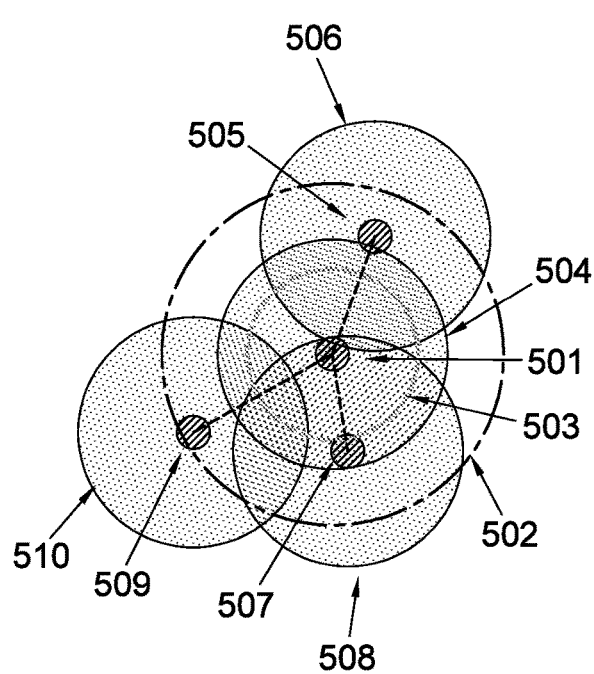
FIG. 5A shows a local area coverage of an updating agent in a first arrangement where the sensor perception range is less than the communicative range.

FIG. 5A shows a local area coverage of an updating agent in a first arrangement where the sensor perception range is less than the communicative range. FIG. 5A shows an updating agent 501 having a communicative range 502 and a desired reference distance 503 (discussed further below). A first local area 504 that can be perceived by the updating agent 501 is also shown in FIG. 5A. The size of the first local area 504 that can be perceived by an updating agent 501 is based on the perception range of the sensor at the updating agent 501. FIG. 5A also shows a first neighbouring agent 505, a second neighbouring agent 507 and a third neighbouring agent 509, each of which are communicatively connected to the updating agent 501 since they are within the communicative range 502 of the updating agent 501.

The first neighbouring agent 505 is associated with a second local area 506 that can be perceived by the sensors of the first neighbouring agent 505. The second neighbouring agent 507 is associated with a third local area 508 that can be perceived by the sensors of the second neighbouring agent 507. The third neighbouring agent 509 is associated with a fourth local area 510 that can be perceived by the sensors of the third neighbouring agent 509.

In FIG. 5A the sensor perception range of each neighbouring node is less than the communicative range of the updating node. FIG. 5A shows that with only three neighbouring nodes there are "blind spots" around the first local area 504 being perceived by the updating agent 501. Specifically, with only three neighbouring agents there are two blind spots within the communicative range 502 of the updating agent 501. Consequently, with the sensor perception range and communicative range shown in FIG. 5A, the presence of three neighbouring agents is not sufficient for the updating agent 501 to be "locally perceiving sufficient area". As a result, the predetermined number of neighbouring agents that are required in order for an updating agent to be locally perceiving a sufficient area in the example of FIG. 5A should be set to be greater than three (e.g. four or more). FIG. 5A also demonstrates how the distribution of neighbouring agents can affect the local area coverage. As will be discussed in more detail below, various arrangements are disclosed herein that take into account both the number of neighbouring agents and their distribution around the updating agent when determining a local area coverage.

Figure 5B:
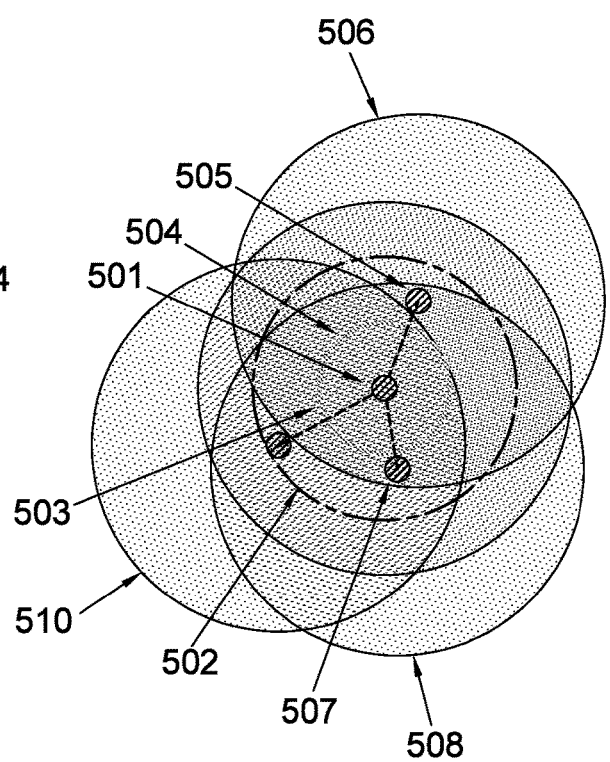
FIG. 5B shows a local area coverage of an updating agent in a second arrangement where the sensor perception range is greater than the communicative range.

FIG. 5B shows a local area coverage of an updating agent in a second arrangement where the sensor perception range is greater than the communicative range. FIG. 5B uses the same reference numerals as FIG. 5A to denote the same features. In FIG. 5B each agent has a greater sensor perception range than in FIG. 5A. Consequently, from the same position each agent is able to perceive, with its sensor, a large area. As a result, in FIG. 5B there are no "blind spots" surrounding the first local area 504 being perceived by the sensor of the updating agent 501. Consequently, with the configuration of the sensor perception range as shown in FIG. 5B, the presence of three neighbouring agents is sufficient for the updating agent 501 to be locally perceiving sufficient area.

FIG. 5A and FIG. 5B demonstrate how the threshold number of neighbouring agents required for an agent to be locally perceiving sufficient area depends on the sensor perception range of the agents in the swarm. Optionally, the threshold number of neighbouring agents is determined based on the sensor perception range of agents in the swarm. In one example the threshold number of neighbouring agents is verified geometrically and the value is chosen that ensures actual full areal coverage.

In another example agents may utilise further criteria to evaluate whether they are sufficiently surrounded by other positioned agents. For example an agent may determine that it is sufficiently surrounded based on the angles to the neighbouring agents.

Figure 6A:
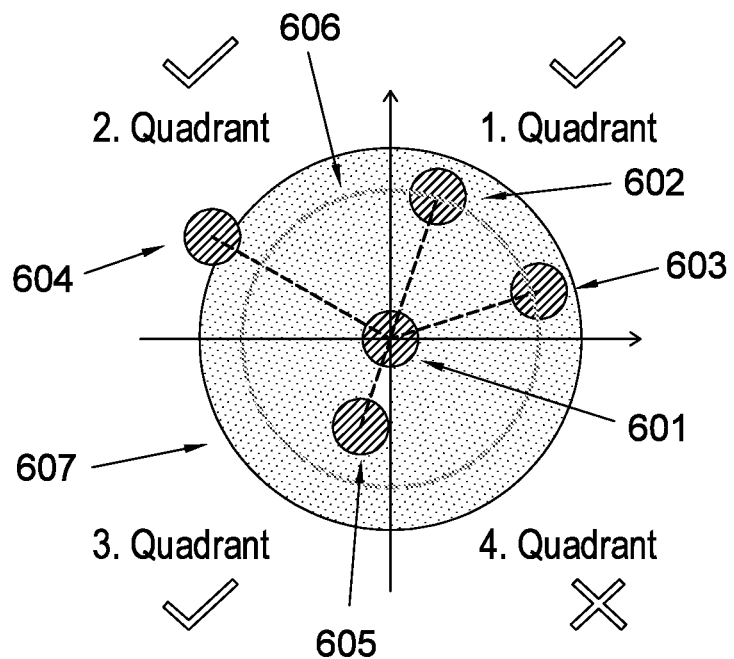
FIG. 6A shows an example of local area assessment using fixed directional fragmentation.

FIG. 6A shows an example of local area assessment using fixed directional fragmentation. FIG. 6A shows an updating agent 601 communicatively coupled to: a first neighbour agent 602, a second neighbour agent 603, a third neighbour agent 604 and a fourth neighbour agent 605. FIG. 6A also shows a desired reference distance 606 of the updating agent 601 (the purpose of which is discussed in more detail below) and a first local area 607 that can be perceived by the sensors of the updating agent 601.

In one arrangement, determining whether the updating agent 601 is locally perceiving a sufficient area further comprises subdividing or fragmenting the first local area 607 surrounding the updating agent 601 into equal portions and determining whether there is at least one neighbouring agent in each of the subdivisions. In FIG. 6A the area surrounding the updating agent 601 is fragmented into four fixed subdivisions (also referred to as sectors). The four subdivisions are of equal size and are also referred to as quadrants. The subdivisions are fixed in the sense that the arrangement of the subdivisions (i.e. the angular distribution of the quadrants or the positions of the boundaries between subdivisions) does not move in use. This approach is advantageous when using low-cost robots with simple sensors (e.g. without 360 degrees LIDAR or wireless radio technology to measure precise relative directions and distances).

In this example determining whether the updating agent is locally perceiving a sufficient area comprises determining a direction to each of the neighbouring agents and determining whether there is at least one neighbour agent in each subdivision. In effect, determining whether there are the predetermined number of neighbouring agents distributed around the updating agent. In FIG. 6A a first subdivision comprises two neighbour agents; the first neighbour agent 602 and the second neighbour agent. A second subdivision comprises the third neighbour agent 604. A third subdivision comprises the fourth neighbour agent 605. However there is no neighbour agent located in the fourth subdivision.

Consequently, when considering whether the updating agent is locally perceiving sufficient area, the updating agent 601 determines that there is not at least one neighbour agent in each subdivision since there is no neighbouring agent in the fourth subdivision. As a result, it is determined that the updating agent 601 is not locally perceiving a sufficient area.

Figure 6B:
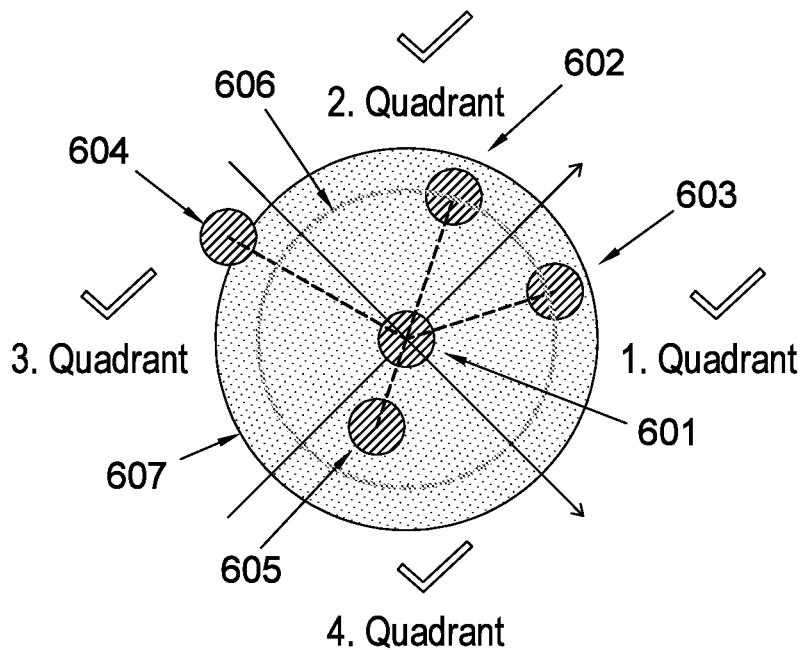
FIG. 6B shows an example of local area assessment including dynamic directional fragmentation.

FIG. 6B shows an example of local area assessment including dynamic directional fragmentation. FIG. 6B uses the same reference numerals as FIG. 6A to denote the same features. In the example of FIG. 6B there are four subdivisions of equal size and determining whether the updating agent is locally perceiving a sufficient area comprises determining a direction to each neighbouring agent and determining whether there is an arrangement of the segmentation in which there is at least one neighbouring agent in each subdivision. This is different to the fixed approach in FIG. 6A where the orientation of the subdivisions (i.e. their relative angular positions) does not change.

For example, in FIG. 6B the subdivisions are rotated clockwise from the fixed arrangement in FIG. 6A. In this rotated arrangement there is at least one neighbouring agent in each segment. Consequently, the updating agent 601 determines that it is locally perceiving a sufficient area. Optionally the orientation of the segments is determined using principal component analysis, trial-and-error or other techniques.

Although in the examples above four segments were used it is emphasised that any number of segments greater than two could be used. Optionally the number of segments is predetermined. In one example the number of segments (also referred to as subdivisions) is verified geometrically and a value is chosen that ensures actual full areal coverage.

A second criteria used by each agent to determine whether the agent is perceiving a sufficient area is whether the agent is close enough to an obstacle or a border of the environment being monitored by the swarm. The agent may use the first criteria and/or the second criteria (i.e. the first criteria; or the second criteria; or the first criteria and the second criteria) to determine whether an agent is locally perceiving a sufficient area.

Figure 7:
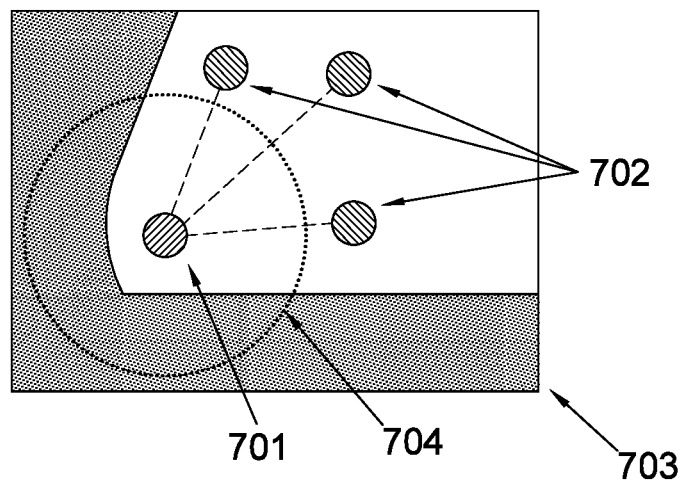
FIG. 7 shows a second criteria used to determine whether each agent is locally perceiving a sufficient area according to an example.

FIG. 7 shows a second criteria used to determine whether each agent is locally perceiving a sufficient area according to an example. A second criteria used by each agent to determine whether the agent is perceiving a sufficient area is whether the agent is close enough to an obstacle or a border of the environment being monitored by the swarm.

When the second criteria is used the updating agent determines whether it is locally perceiving a sufficient area based on whether the agent is close enough to an obstacle or a border of the environment being monitored by the swarm. In this case the agent uses a sensing means (e.g. visual sensor, or radio sensor) to identify whether there is an obstacle in the area that it can perceive. Optionally, the agent determines whether a wall or an obstacle is within a predetermined distance of the agent. The predetermined distance may be less than a communicative range of the agent. This can be seen in the second criteria of FIG. 7 which shows an updating agent 701 associated with neighbouring agents 702, and an obstacle/wall 703 that is within a predetermined distance 704 of the updating agent 701. The updating agent 701 identifies, using its on-board sensing means, that there is an obstacle/wall 703 within the predetermined distance, for example, by detecting a static object that is not responding to an agents communications that prompt other agents to identify themselves.

In one example, the on-board sensing means of the updating agent 701 identifies the presence of an object (e.g. using 360 degrees LI DAR (Light Detection and Ranging)). The relative distances and angles to neighbouring agents 702 are estimated by the updating agent 701 based on communication exchanges with the neighbouring agents 702 using the robot's on-board wireless radio technology (e.g. based on Received Signal Strength Indicator (RSSI) measurements and Angle-of-Arrival (AoA) analysis). The updating agent 701 subsequently determines whether there are any detected objects that were not identified using the means to locate neighbouring agents (i.e. whether any of the objects that were detected have not responded to the wireless communication signals). If a detected object is not also identified using the means to locate neighbouring agents then it is determined that the objects is a wall or obstacle.

In another example walls and/or obstacles are equipped with radio equipment that identifies itself as a wall/object. In this case the agent 701 determines that there is an obstacle/wall within the predetermined distance using the on-board wireless radio technology.

If an agent identifies, using the sensing means comprised within the agent that there is a wall or an obstacle in at least a portion of the area it can interrogate, then the agent is determined to be locally perceiving a sufficient area.

The agent may use the first criteria and/or the second criteria (i.e. the first criteria; or the second criteria; or the first criteria and the second criteria) to determine whether an agent is locally perceiving a sufficient area.

In a further embodiment, the agent determines an angular range of the agent's observation area that includes the obstacle/wall 703 and uses the first criteria (i.e. determining whether there are a predetermined number of neighbours) for assessing whether the remainder of the angular range is in the proximity of any blind spots, thereby meaning that the agent would not be locally perceiving sufficient area.

In another example directional fragmentation and both the first criteria and the second criteria are used to determine whether the updating agent is locally perceiving a sufficient area.

Figure 8A:
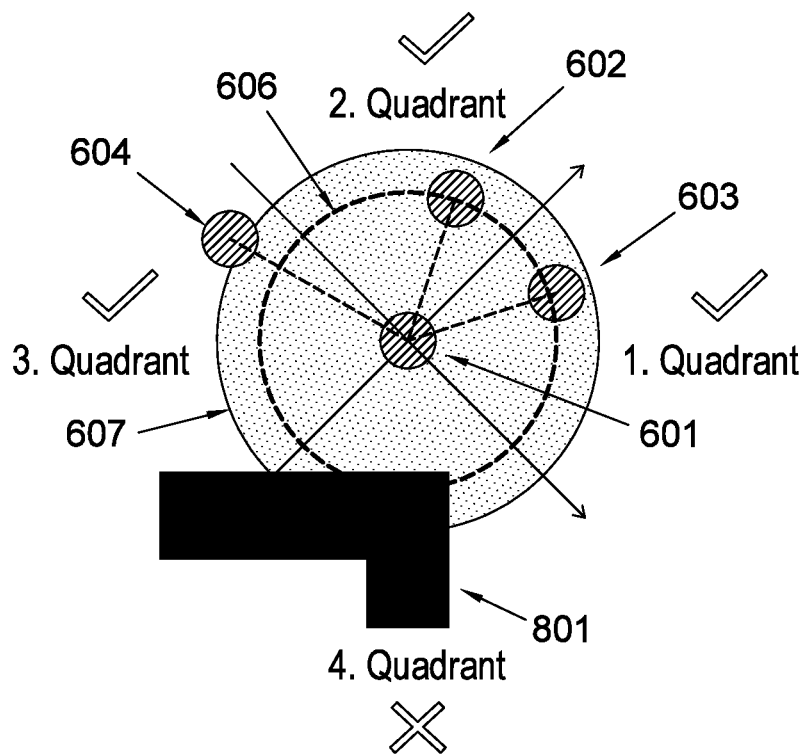
FIG. 8A shows a first example of local area assessment using the first criteria, the second criteria and directional fragmentation.

FIG. 8A shows a first example of local area assessment using the first criteria, the second criteria and directional fragmentation. FIG. 8A uses the same reference numerals as FIG. 6B to denote the same features. The arrangement shown in FIG. 8A also includes a wall 801 within the range of the sensor of the updating agent 601. When using both the first criteria and the second criteria (referred to herein as a hybrid approach), the updating agent 601 determines whether there is: 1) at least one neighbouring agent, or 2) whether there is a wall/obstacle that entirely occupies (or fills) the angular range; in each subdivision. For example, in FIG. 8A the updating agent 601 determines that the wall 801 does not entirely fill the angular range of the fourth subdivision. Consequently, it is determined that the updating agent 601 is not locally perceiving a sufficient area.

Figure 8B:
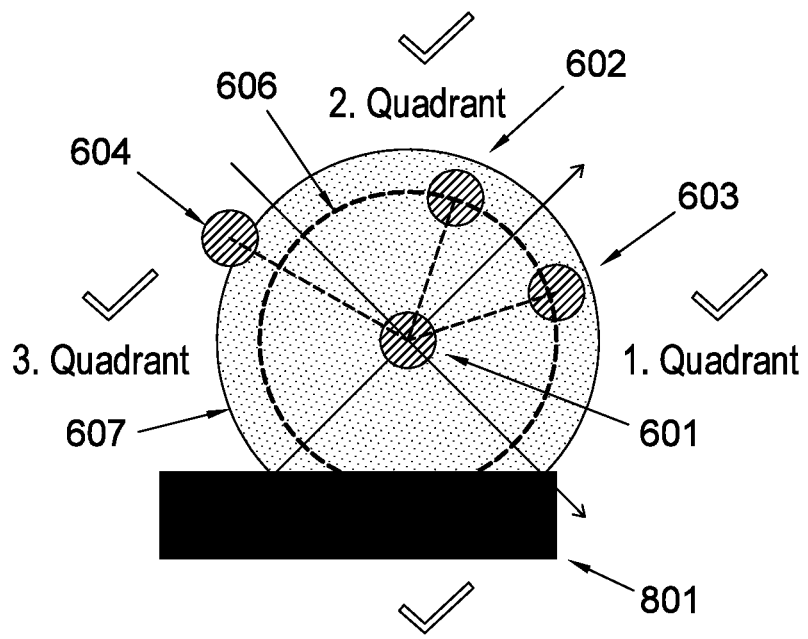
FIG. 8B shows a second example of local area assessment using the first criteria, the second criteria and directional fragmentation.

FIG. 8B shows a second example of local area assessment using the first criteria, the second criteria and directional fragmentation. In FIG. 8B the wall 801 is present in the entire angular range of the fourth subdivision. Consequently, the fourth subdivision satisfies the criteria that there is a wall/obstacle that entirely occupies (or fills) the angular range. Furthermore, each of the first, second and third subdivisions satisfy the criteria used in the hybrid approach since they each contain at least one neighbouring agent. Consequently, the updating agent 601 determines that it is locally perceiving a sufficient area.

Although the hybrid approach (i.e. using the first and the second criteria) is discussed in relation to dynamic fragmentation of FIG. 6B, it will be appreciated that fixed fragmentation (as described in FIG. 6A) could also be used.

Returning to FIG. 3, once the local area coverage has been assessed by each agent, the method proceeds to step 303 where it is determined whether full areal coverage has been reached or, if full areal coverage had already been reached, whether full areal coverage has been maintained following the movements performed while executing the Areal Coverage Optimising Movement Scheme.

It is important that global areal coverage is assessed in order to ensure that requests or questions submitted to the swarm system (e.g. by a user) can be answered accurately. That is to say that only once full area coverage is reached can it be concluded that the responses provided by the deployed agents are representative of the area being considered. For example, without full areal coverage it may be determined by the agents that an object of interest is not present in the area despite the object being present, just not within the sensing range of the agents in the swarm.

After each agent assesses their local area coverage, the agents transmits a communication advertising whether they are locally perceiving sufficient area (optionally in response to receiving a request message querying whether each agent is locally perceiving sufficient area). This communication is relayed, via the mesh network maintained by the agents.

In an example a query is submitted to the swarm of agents. A message containing the query is broadcast to all of the agents and each agent transmits a unique answer message that is relayed back to source of the query. The source of the query may be an agent in the swarm of agents. The source of the query may also be a device in communicative range of an agent. In this case the device is able to communicate with each agent in the swarm by virtue of the mesh network formed between the agents. By collecting the answer messages an agent, or a device in communicative range of an agent can determine whether there is full area coverage based on whether at least one agent reports that they are not locally perceiving sufficient area. Alternatively the query broadcast to each of the agents in the swarm could be whether the agent is not locally perceiving sufficient area.

In an example where the agents in the swarm of agents are robots, a controller device is used to control the deployment of robots from a deployment station to the area of interest currently being occupied by the swarm of robots. The controller device is communicatively coupled to at least one robot in the swarm of robots. By virtue of the robots maintaining a mesh network the controller device is able to receive communications from each of the deployed robots. Each of the communications advertising a robot's local area coverage are communicated to the controller via the mesh network. Based on these communications the controller device determines whether full areal coverage has been achieved. In one example the controller device presents a user with a number of agents that are locally perceiving sufficient area at an instant in time (e.g. 80 out of 100 deployed agents) and the user interacts with the controller device to deploy further agents.

In a different example, no controller device is required to deploy addition robots from a deployment station. For example, the robots can be deployed in an out-of-the-box manner, meaning unpack it, put it down within communication reach of any other running robot, turn it on, and off it goes being part of the swarm system.

If it is determined in step 303 that full network coverage has not been reached/maintained then more agents are deployed in step 304 and the method proceeds to step 302 where each agent executes the Areal Coverage Optimising Movement scheme (ACOMS) again.

In an embodiment new agents are deployed to the swarm sequentially to any location within the observation boundary that is within communicative reach of the existing communications network. In another example multiple agents are deployed to the swarm of agents at the same time. After deploying new agents the position of each agent in the mesh network is individually adjusted by each agent when it re-executes the Areal Coverage Optimising Movement scheme (ACOMS) as will be discussed in more detail below.

If it is determined in step 303 that full areal coverage has been reached/maintained then the method proceeds to step 305. Steps 305 to 307 relate to a use-case of a swarm of robots and are discussed to present an example use-case in which the Areal Coverage Optimising Movement scheme (ACOMS) could be used. However these steps are discussed as an example only, and are optional.

In step 305 it is determined whether there are any pending user requests that can be submitted to the reactive swarm system. A pending request could be, for example, a request to determine whether an object of interest is located within the boundary being monitored by the swarm.

If it is determined in step 305 that there are no pending user requests then the method proceeds to step 302 where the agents execute the Areal Coverage Optimising Movement Scheme (ACOMS) again.

If it is determined that there is a pending user request in step 305 then the method proceeds to step 306 where the request or question that was submitted to an agent in the mesh network is broadcast to all swarm agents through the maintained mesh communications network. In step 307 each agent reacts and returns its answer to the requesting agent. In step 308 the requesting agent forms an answer to its question in response to receiving the responses in step 307.

When the method of FIG. 3 is implemented by a swarm of agents the swarm becomes reactive to the user requests/questions, since the agent that receives the request/question uses the maintained mesh communication network to broadcast the request/question to all of the other agents. In response to receiving the broadcast request, every agent perceives its local environment and performs the request or answers the question. The individual responses are then communicated back to the requesting node, allowing the requesting node to globally assess the environment the swarm operates in real time.

In another example the Areal Coverage Optimising Movement Scheme (ACOMS) (in step 302) is executed continuously at each agent independently of the other steps shown in FIG. 3 (in particular, steps 303 and 304).

As will be discussed in more detail below, the Areal Coverage Optimising Movement Scheme (ACOMS) assesses and optimises areal coverage while maintaining mesh connectivity. This enables the swarm system to perceive the entire environment in real time. This is particularly useful in environments that are constantly/dynamically changing (e.g. human or other entities modify and change the layout, obstacles, objects etc.). In this case a stored or built map of the environment or database of the objects, for example, would be of little value for optimising areal coverage and therefore ensuring that truthful answers are obtained in response to submitted questions.

Figure 9:
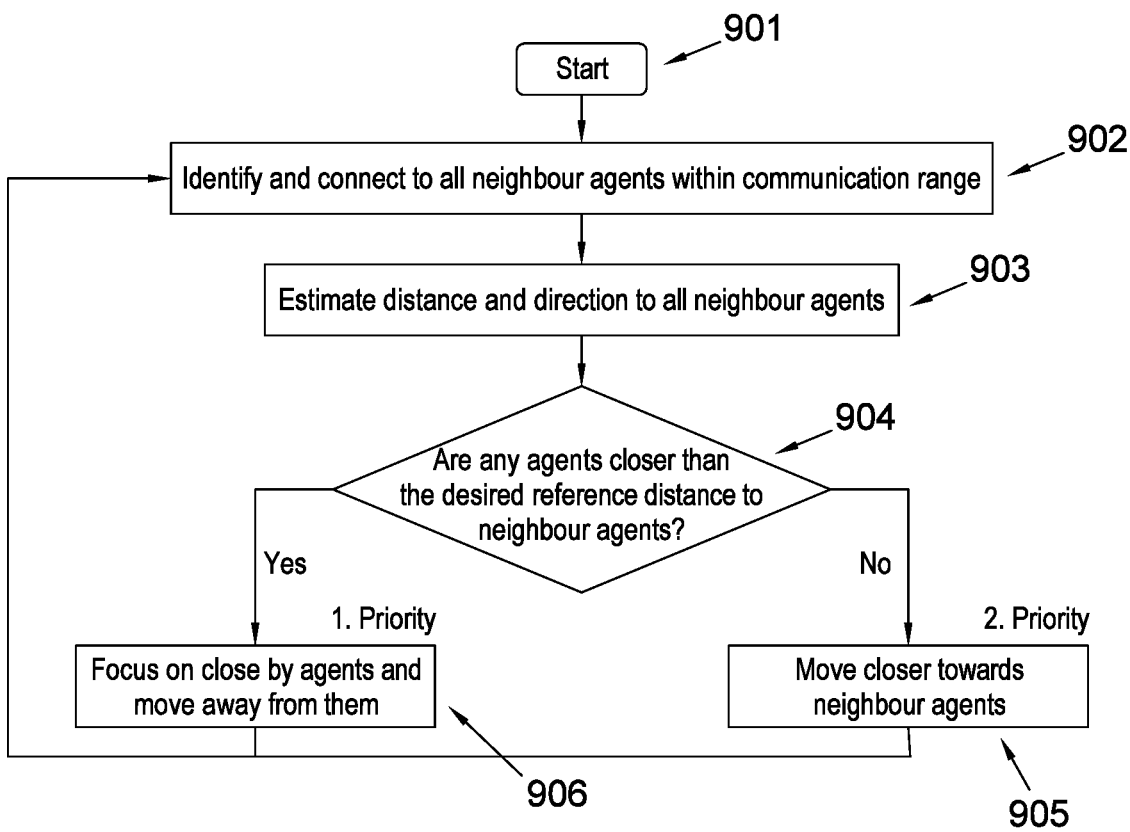
FIG. 9 shows an Areal Coverage Optimising Movement Scheme (ACOMS) according to an example.

FIG. 9 shows an Areal Coverage Optimising Movement Scheme (ACOMS) according to an example. The Areal Coverage Optimising Movement Scheme (ACOMS) shown in FIG. 9 is implemented at an agent in the swarm of agents and assumes no prior knowledge of the environment and no prior knowledge of the optimum agent position within the environment. To implement the Areal Coverage Optimising Movement Scheme (ACOMS) an agent must be mobile (i.e. capable of movement as opposed to being fixed in position). The Areal Coverage Optimising Movement Scheme (ACOMS) is executed independently at each mobile agent in a swarm of agents. Consequently, FIG. 9 forms part of the local instructions that are carried out by each agent. The collective effect of each agent performing these actions is a swarm of robots that achieves full areal coverage while maintaining a communication network between the agents (e.g. robots).

The method begins in step 901 and proceeds to step 902. In step 902 the agent implementing the Areal Coverage Optimising Movement Scheme (ACOMS), otherwise known as the updating agent, identifies and connects to all neighbouring agents. Two agents are considered to be "neighbours" if they are within communicative range of each other. That is to say that the two agents are able to wirelessly communicate (i.e. transmit and receive) information with each other. Optionally, where the method of FIG. 9 is executed for a number of iterations, the updating agent stays connected to neighbouring agents for more than one iteration without disconnecting and reconnecting.

The communicative range of each agent may vary for a number of reasons including, but not limited, to the presence of obstacles in the vicinity of the agent.

Preferably neighbouring agents are identified and neighbour information is obtained by direct messaging other agents over a wireless communication link.

In an embodiment each agent in the mesh network has a unique identifier and the updating agent, in step 902, stores the unique identifier of each neighbouring agent. Optionally, the unique identifier is a Media Access Control (MAC) identifier.

In step 903 the updating agent estimates the distance and direction to each of the neighbouring nodes. In an embodiment each agent comprises a measurement means, which it uses to estimate the relative distance and direction to neighbouring agents. Optionally each agent is equipped with a radio (e.g. for wireless communication) and the measurement means estimates the direction to neighbouring agents based on angle-of-arrival measurements of a signal that is received during direct communication with a neighbouring agent. In another example, the measurement means comprises a sensor, for example a visual sensor, to estimate the distance and direction to neighbouring agents. In a further embodiment both a sensor (e.g. a visual sensor) and radio transmission/reception means are used for determining the relative distance and direction to neighbouring agents.

As discuss above, the communicative range is the distance over which wireless communications generated by the agent in question can be received, and a distance from which the agent in question can receive communications from other agents. The communicative range could be different for each agent and depends on the environment in which the agent is located. Since two agents have identified each other as neighbours, they are able to communicate with each other, and therefore they are, by definition, within communicative range of each other.

In an example the communicative range is predefined (e.g. set to 3 metres). However this approach is sub-optimal because the communication link may, in reality, be unreliable (e.g. due to obstacles in the communication path).

Consequently in an alternative example, the updating agent also estimates the link quality to each of its neighbours in order to determine the updating agent's communicative range. To do this the updating agent measures various link parameters based on the direct communication exchanges between an agent and its neighbour. These link parameters include, but are not limited to, Signal-to-Noise Ratio (SNR) of the received signals, Time Difference of Arrival (TDoA), Angle of Arrival (AoA), transmission rate, and round trip time.

In another example, when the updating agent has more than one neighbouring agent, the updating agent measures the Signal-to-Noise Ratios (SNR) of the received signals from each of the neighbouring agents. The communication range is estimated using mathematical formulas that use the Signal-to-Noise Ratio (SNR) and the distance between the updating agent and the neighbouring agent to determine a (maximum) communicative range. The updating agent estimates a communicative range for each of the measured SNR values (generated from communications with each of the neighbouring agents). The communicative range is then calculated according to an average of the communicative ranges that were determined based on each of the measured SNR values.

The quality of the communication link between an updating agent and a neighbouring agent can vary over time. For example, there might significant radio signal reflections or absorption in one particular part of the environment reducing the communication distance. Consequently, the average communicative range is recalculated during each iteration and the desired reference distance is updated accordingly.

In one example, each agent comprises a timer and a wireless communication means to communication and measure these link parameters.

In step 903 the agent also estimates its desired reference distance to neighbours. In an embodiment the desired reference distance is a proportion of an agent's communicative range. The proportion being less than 1 times, such that the desired reference distance is less than the agent's communicative range. Optionally, the desired reference distance is half (i.e. 0.5 times) the determined communicative range. In another example the desired reference distance is limited by the range of the sensor(s) used to perceive the agents local environment (i.e. the sensor perception range). This ensures that the agent's (i.e. the updating agent and the neighbouring agents) remain sufficiently close in order to prevent or miss any "blind spots" during local area assessment.

Once the communicative range has been determined and the desired reference distance has been calculated the method proceeds to step 904. In step 904 the updating agent determines whether there are any neighbour agents closer than the desired reference distance. The phrasing of the determination in step 904 demonstrates the priority of the swarm behaviour (i.e. the question posed in step 904 indicates the behaviour/situation that the scheme avoids as a first priority).

First the updating agent determines whether there are any neighbouring agents that are closer than the desired reference distance. If there are neighbouring agents closer than the desired reference distance then the scheme focusses on avoiding other agents and increasing the distance to these neighbouring nodes. Where it is identified in step 904 that there is at least one neighbouring agent that is closer than the desired reference distance the method proceeds to step 906, since moving away from agents that are too close is a first priority of the scheme. As a result, in step 906 the updating agent calculates a movement direction and magnitude considering only those neighbouring agents that are closer than the desired reference distance (i.e. ignoring neighbouring nodes that are further away than the desired reference distance in any movement determinations). In step 906 the updating agent determines a movement direction and magnitude and executes the movement, thereby moving away from the selected neighbour agents.

If it is determined in step 904 that all of the neighbouring agents are not closer than the desired reference distance, the method proceeds to step 905. In step 905 the updating agent determines a movement direction and a movement magnitude. The updating agent subsequently executes the movement, in this case to move closer towards neighbouring agents, thereby reducing the distance so it is closer to the desired reference distance so that mesh connectivity is maintained.

By determining whether there are any (i.e. at least one) neighbouring agents that are closer than the desired reference distance, the local actions of the updating agent preferentially takes action to avoid collisions with other agents.

As discussed above, the movement direction and the movement magnitude of the updating agent is determined in steps 906 and 905 depending on the determination in step 904. Determining the movement direction and magnitude is discussed below in the context of an example where there are zero neighbouring agents that are closer than the desired reference distance. However it will be appreciated the same approach is followed when there is at least one neighbouring agent that is closer than the desired reference distance.

Figure 10:
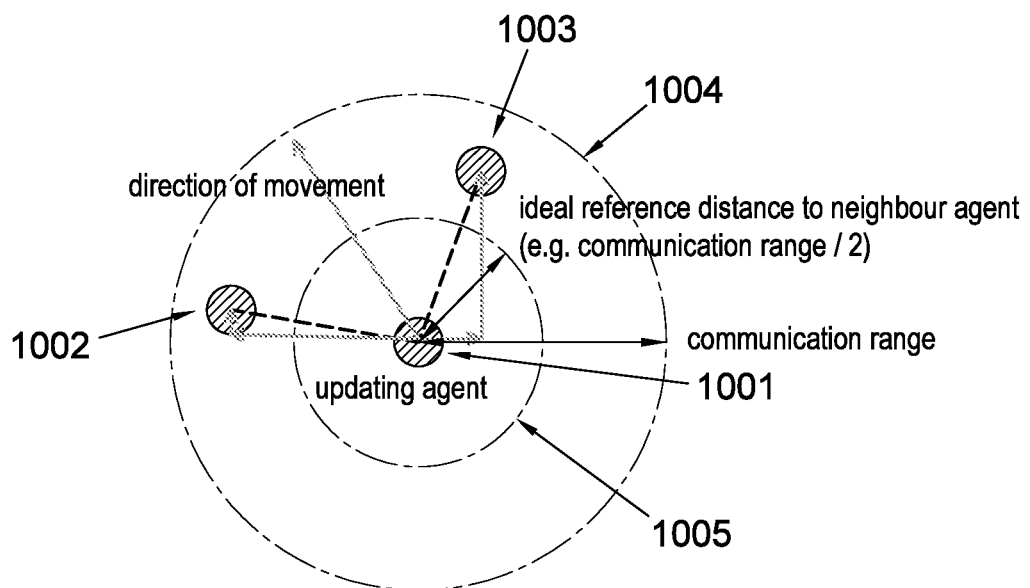
FIG. 10 shows an illustration of a swarm superimposed with an updating agent's communicative range and desired reference distance according to an example.

FIG. 10 shows an illustration of a swarm superimposed with an updating agent's communicative range and desired reference distance according to an example. FIG. 10 shows an updating agent 1001, which is executing the Areal Coverage Optimising Movement Scheme (ACOMS) according to an embodiment. The updating agent 1001 is associated with a first neighbour agent 1002 and a second neighbour agent 1003. Both the first neighbour agent 1002 and the second neighbour agent 1003 are within a communicative range 1004 of the updating agent 1001. As discussed above, as part of the Areal Coverage Optimising Movement Scheme (ACOMS), the updating agent 1001 determines its communicative range 1004 and calculates its desired reference distance 1005, which is optionally a proportion of the communicative range 1004. In the example shown in FIG. 10 the desired reference distance 1005 is half (i.e. 0.5 times) the communicative range 1004.

In the example shown in FIG. 10, it is determined in step 904 that neither of the neighbour agents (i.e. neither of the first neighbour agent 1002 or the second neighbour agent 1003) are within the desired reference distance 1005 of the updating agent 1001. Consequently the method shown in FIG. 9 proceeds to step 905 and determines a movement direction and magnitude to move the updating agent 1001 closer to the neighbouring agents, thereby ensuring mesh connectivity is maintained.

Step 905 comprises two parts. Firstly, the updating agent 1001 calculates a new movement direction and magnitude, and secondly the updating agent 1001 executes the determined movement.

The updating agent determines the direction of movement based on the direction of each neighbouring agent that is being considered. As discussed above, there could be instance where the number of neighbouring agents being considered during movement direction analysis is less (i.e. a sub-set of) the total number of neighbour nodes. For example, this could occur when there is at least one neighbour agent that is closer than the desired reference distance. Since the priority of the scheme is to avoid collisions, any movement direction determination will only be based on the direction to the at least one neighbour agent that is closer than the desired reference distance (i.e. not including the neighbour agents that are located away from the updating agent by more than the desired reference distance). In this case the neighbouring agents being considered include only those neighbouring agents that are closer than the desired reference distance.

In the example of FIG. 10 there are no neighbouring agents closer than the desired reference distance. Consequently, all neighbouring agents are being considered during movement direction determination. In an embodiment determining the direction of movement for the updating agent comprises determining a direction of the sum of the direction vectors to each neighbouring node being considered.

The directions from the updating agent 1001 to the first neighbour agent 1002 and second neighbour agent 1003 (both of which are being considered for movement direction determination) are represented as a vector comprising two dimensions in FIG. 10. The direction of movement for the updating agent 1001 is the sum of the direction vectors for each neighbour agents being considered, namely the first neighbour agent 1002 and the second neighbour agent 1003. In the example of FIG. 10, the direction of movement for the updating agent is calculated according to the direction of the sum of the direction vector to the first neighbour agent 1002 and the direction vector to the second neighbour agent 1003. Optionally the resulting vector is normalised so that normalised vector sum has an absolute value of 1.

After determining the movement direction, the updating agent 1001 determines a movement magnitude. The movement magnitude is calculated according to an activation function.

FIG. 11 shows an activation function for determining a movement magnitude according to an example. The activation function uses the distance to a neighbouring agent and the desired reference distance to determine a movement magnitude for the updating agent 1001. When more than one neighbour agent is being considered, the movement magnitude (i.e. the output of the activation function) is calculated separately for each updating agent/neighbour agent pair, and an average of each of these movement magnitudes is taken to determine the movement magnitude used by the updating agent.

As can be seen in FIG. 11, if neighbour agent's distance is less than the desired reference distance to neighbouring agent, the updating agent 1001 will move away from that neighbouring agent, thereby increasing the distance so that it is closer to the desired reference distance and preventing collisions. The closer the updating agent is to the neighbouring agent, the faster the updating agent moves away from the neighbouring node. This can be seen in the higher movement magnitudes in FIG. 11 that are associated with lower distance values to neighbouring agents.

If, on the other hand, the updating agent's distance to the neighbouring agent is greater than the desired reference distance, the updating agent will move towards the neighbouring agent, thereby reducing the distance so it is closer to the desired reference distance. If the neighbour agent's distance is almost equal to the communicative range, then the updating agent moves rapidly towards the agent, thereby minimising the distance. This is because, at this distance there is a high chance that mesh connectivity could be lost, consequently quick action must be taken. This can be seen in FIG. 11 which shows a higher value movement magnitude as the distance to the neighbouring agent increases. From FIG. 11 It will also be appreciated that a negative movement magnitude results in a movement in the opposite direction to a positive movement magnitude.

As can be seen in FIG. 11, the profile of the activation function also accounts for situations where there is only a small difference between the distance to a neighbouring agent and the desired reference distance. In this case the determined movement magnitude is small and the updating agent undertakes little or no movement. This reduces the overall movement noise and energy consumption of the system once a steady state is reached.

As will be apparent from the above, the non-linear activation function shown in FIG. 11 enables different distances to be treated differently. For example, large distances result in high movement magnitudes as it is paramount that the distance is reduced in order to maintain connectivity of the mesh network. Furthermore, small distances result in little or no movement so as to reduce movement and conserve an agent's energy.

In FIG. 11 the movement magnitude has a range from +100 to −100. In an example, the movement magnitude corresponds to a speed of the agent. In this case the agent moves with the determined speed until the next sample time (i.e. the next time the method of FIG. 9 is performed). Alternatively the movement magnitude corresponds to an acceleration of an agent or a distance to be moved by the agent.

Although a particular activation function is shown in FIG. 11 it will be appreciated that the exact function is an example only, and that other functions that achieve the same effect (e.g. differentiate between large distances and small distances when determining movement magnitude) could be used. Furthermore, the scales in FIG. 11 (e.g. movement magnitude and distance) are for example only, and other scaling could be used as would be appreciated by the person skilled in the art.

After determining the movement magnitude and direction the updating agent 1001 executes the determined movement.

As will be apparent from the above, the Areal Coverage Optimising Movement Scheme (ACOMS) is only implemented on agents that are mobile (i.e. capable of movement) since the method involves proactive action (e.g. movement) to avoid collisions, optimise coverage and maintain the connectivity of the mesh network. However this does not prevent the scheme from being deployed in an environment where some of the agents are fixed (i.e. not able to move and implement the Areal Coverage Optimising Movement Scheme (ACOMS) as discussed herein). For example, the deployment could include fixed nodes to which traffic (e.g. communication messages) needs to be transferred. In this case the remaining mobile agents move dynamically regardless of the routing protocol with the aim to contribute to the overall connectivity while optimising and assessing the overall areal coverage in any enclosed environment or an environment with virtual barriers.

Figure 12:
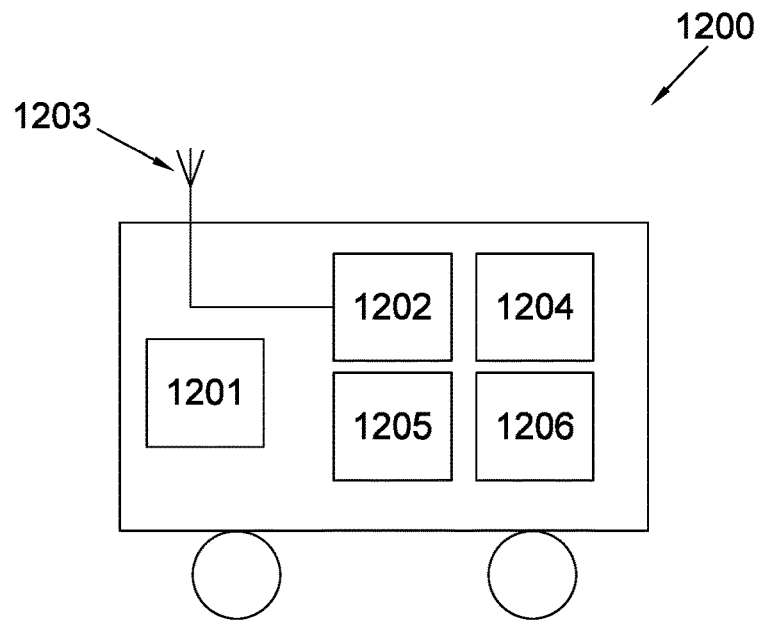
FIG. 12 shows a robot 1200 according to an example.

FIG. 12 shows a robot 1200 according to an example. As discussed above, a robot is a type of agent. The robot 1200 comprises a driving means 1201 such as a holonomic drive. The driving means 1201 controls the movement of the robot 1200, for example, as it moves around the environment.

The robot 1200 further comprises a wireless input/output port 1202 communicatively coupled to an antenna 1203 to transmit and receive signals. The input/output port 1202 is configured to transmit and receive radio signals, preferably short-range radio communication signals. The robot 1200 may receive a signal from another robot in the environment. The robot 1200 may transmit a signal to another robot in the environment, or globally broadcast it to all the robots in the environment.

Each robot 1200 further comprises a microprocessor 1204 coupled to non-volatile memory 1205. The microprocessor 1204 is configured to execute instructions stored in the non-volatile memory 1205. Execution of these instructions causes the robot 1200 to perform some of the method steps described herein, including, but not limited to, the Areal Coverage Optimising Movement Scheme (ACOMS) discussed herein. For example, execution of the instructions may cause a control module 1206 in conjunction with the driving means 1201 to move the robot 1200 in the environment.

Optionally, the microprocessor 1204 is configured to answer questions and respond to requests received from other agents in the swarm.

Whilst in FIG. 12 only one antenna is connected to the input/output port 1202, it is emphasized that the input/output port 1202 may be communicatively coupled to more than one antenna.

The robot 1200 may further comprises a measurement means such as a radio or a visual sensor, which it uses to estimate the relative distance and direction to neighbouring agents. The robot 1200 may also comprise any other sensor that it requires to answer user requests depending on the use-case. For example, the robot 1200 may be used for temperature monitoring. In this case each robot 1200 would additionally be equipped with a temperature sensor.

The above described methods have the advantage that they can be implemented using off-the-shelf hardware and radios. As a result, simple agents can obtain full distributed mesh networking connectivity using the method disclosed herein. This is achieved without requiring sophisticated global localisation or communication infrastructure.

The technique described above enable swarm agents to maintain connectivity while expanding, optimising, and assessing areal coverage. The techniques discussed above have the following characteristics:

Decentralised: Decisions made by agents are purely based on their local environment and their close neighbours. The mobile agents take advantage of message exchanges to get status information about their neighbourhood and action is taken that increases the overall performance of the system.

Scalable: as a consequence of the previous property, the proposed solution is scalable in the number of swarm agents. Since the Areal Coverage Optimising Movement Scheme (ACOMS) only requires the relative distances and directions to neighbour agents, it does not depend on the number of connected agents (i.e. the number of agents in the swarm). As a result, the scheme described herein in particularly scalable for increasing deployment size.

Adaptive: Areal Coverage Optimising Movement Scheme (ACOMS) ensures that the local connectivity quality is monitored based on close neighbours and link information. This is then considered in the updated movement according to a predefined priority scheme. Further, mobile robots perceive their environment and avoid obstacles in a reactive fashion. Consequently, the proposed (priority-based) movement control scheme Areal Coverage Optimising Movement Scheme (ACOMS) is adaptive to unknown complex environments, topology changes, and the evolution of the network characteristics.

Fault-tolerant and resilience: If an agent fails, the rest of the swarm continues to operate and contribute to the system's overall success.

The overall swarm displays self-organisation, self-optimisation, and self-healing capabilities in maintaining connectivity and optimising coverage through the proposed algorithms.

Rapid and out-of-the-box deployment of the swarm system.

The method discussed herein can be used to build a cohesive mesh communication network (i.e. single connected cluster of agents) in both indoor and outdoor environments with zero existing infrastructure. Such a swarm system can monitor, observe, examine and manipulate its unknown complex environment based on user requests in a reactive fashion. The agents automatically reposition themselves to maintain mesh connectivity while optimising areal coverage. Furthermore the swarm system can assess its overall areal coverage so that number of deployed agents can be optimised. A robotic swarm system optimising and assessing areal coverage while maintaining mesh connectivity in unknown and complex environments could be used in various industries ranging from logistics, retail, healthcare, construction, agriculture, and mining to disaster support and surveillance. Also, in environments that might already have an existing communication network infrastructure, the dynamically built and maintained mesh network would provide redundancy and more reliability covering all the relevant area. Such an adaptable robotic swarm could maintain a communication network in some dynamically changing environment and could also provide network connectivity to other systems that might operate in that environment.

This area (size and shape) being observed by the swarm may be initially unknown. However, due to the Areal Coverage Optimising Movement Scheme (ACOMS) discussed above, the cluster of agents stays cohesive (meaning all agents stay connected in one unified cluster).

To conclude, such maintained ad hoc networks, wireless sensor network, local area network and mesh networks can be used for a broad range of purposes ranging from community and neighbourhood networking, transportation systems, all the way to networking for developing countries, connection of isolated locations, spontaneous networking, and disaster recovery.

In summary, the Areal Coverage Optimising Movement Scheme (ACOMS) discussed above generates actions that individual agents must take in order to achieve the desired overall behaviour of maintaining connectivity and optimising and assessing areal coverage. The behaviours are designed bottom-up; this means agent-to-agent interactions are designed, which in turn generates the emergent behaviour of the swarm.

Having a fundamentally robust control scheme in place allows the system to fine-tune and optimise the parameters of its pre-designed control framework on the fly (i.e. online) and in real-time with limited computational power available.

In an example, parameters such as the current communication range, ideal reference distance, and/or parameters of the activation function are updated/learned/optimised by the agents on the fly. Whereas outcome critical parameters to assess areal coverage such as the minimum number of close neighbour agents, the distance thresholds and other parameters to determine whether obstacles/walls are detected are only be changed by a user.

The Areal Coverage Optimising Movement Scheme (ACOMS) discussed above could be used in minimal infrastructure environments. Minimal infrastructure environments include environments with zero or minimal infrastructure which includes wireless access points. The Areal Coverage Optimising Movement Scheme (ACOMS) discussed above can operated in these environments because it does not require infrastructure like wireless access points.

Furthermore the methods described above do not require a centralised computation unit to be set up.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method for controlling the position of an updating agent in a decentralised multi-agent system, the method comprising:
   identifying a first neighbouring agent within a communicative range of the updating agent;
   estimating a first distance to the first neighbouring agent and a first direction to the first neighbouring agent;
   determining a movement direction based on the first direction to the first neighbouring agent;
   determining a movement magnitude based on an activation function, the first distance to the first neighbouring agent, and a desired reference distance, wherein:
      the activation function is configured such that the greater the difference between the first distance to the neighbouring agent and the desired reference difference, the larger the movement magnitude; and
   moving the updating agent based on the movement direction and the movement magnitude.

2. The method according to claim 1, wherein the activation function is configured to generate a movement magnitude of zero when a difference between the first distance to the neighbouring agent and the desired reference difference is less than a threshold.

3. The method according to claim 1, wherein the method further comprises:
   identifying a second neighbouring agent within the communicative range of the updating agent;
   estimating a second distance to the second neighbouring agent and a second direction to the second neighbouring agent;
   determining whether the first neighbouring agent and the second neighbouring agent are located within the desired reference distance of the updating agent; and
   in response to determining that the first neighbouring agent is located within the desired reference distance of the updating agent and the second neighbouring agent is not located within the desired reference distance of the updating agent:
      determining the movement direction based on only the first direction to the first neighbouring agent; and
      determining the movement magnitude based on the activation function, the desired reference distance, and only the first distance to the first neighbouring agent.

4. The method according to claim 3, wherein:
   in response to determining that either:
      the first neighbouring agent and the second neighbouring agent are located within the desired reference distance of the updating agent; or
      the first neighbouring agent and the second neighbouring agent are not located within the desired reference distance of the updating agent; the method further comprises:
         determining the movement direction according to a sum of a direction vector to the first neighbouring agent and a direction vector to the second neighbouring agent;
         determining a first movement magnitude based on the first distance to the neighbouring agent, the activation function and the desired reference distance;
         determining a second movement magnitude based on the second distance to the second neighbouring agent, the activation function and the desired reference distance; and
         determining the movement magnitude based on an average of the first movement magnitude and the second movement magnitude.

5. The method according to claim 1, further comprising:
   determining a communicative range of the updating agent based on a communication between the updating agent and the first neighbouring agent; and
   setting a desired reference distance less than the communicative range.

6. The method according to claim 1 wherein the first neighbouring agent and the updating agent are robots.

7. A method of operating a decentralised multi-agent system deployed within an area, the method comprising:
   updating a position of an updating agent in the decentralised multi-agent system according to the method of claim 1;
   determining a local area coverage for each agent in the decentralised multi-agent system;
   determining whether full areal coverage is achieved by the decentralised multi-agent system based on the local area coverage performed by each agent in the decentralised multi-agent system; and
   in response to determining that full areal coverage is not achieved by the decentralised multi-agent system:
      deploying a further agent within the area to be part of the decentralised multi-agent system.

8. The method according to claim 7, wherein determining whether full areal coverage is achieved comprises:
   broadcasting a query to the decentralised multi-agent system;
   transmitting, by each agent in the decentralised multi-agent system, an indication of whether each agent is locally perceiving a sufficient area; and
   determining that full areal coverage is achieved in response to receiving an indication that each agent in the decentralised multi-agent system is locally perceiving sufficient area wherein:
   an agent is locally perceiving sufficient area if there are no blind spots in sensor coverage surrounding an area being perceived by the agent.

9. The method according to claim 8 wherein determining the local area coverage for each agent in the decentralised multi-agent system further comprises:
   determining, by the updating agent, whether the updating agent has identified at least a predetermined number of neighbouring agents; and/or
   determining, by the updating agent, whether the updating agent is within a predetermined distance of at least one obstacle.

10. The method according to claim 9 wherein:
    determining the local area coverage for each agent in the decentralised multi-agent system further comprises:
       dividing an area surrounding the updating agent into a first sector and a second sector, wherein the first sector is associated with a first angular distance and the second sector is associated with a second angular distance; and determining that the updating agent is locally perceiving sufficient area in response to determining that:
the first sector comprises:
a second neighbouring agent; or
a first obstacle that spans the first angular distance; and
the second sector comprises:
a third neighbouring agent; or
a second obstacle the spans the second angular distance.

11. An apparatus for controlling the position of an updating agent in a decentralised multi-agent system, the apparatus configured to:
identify a first neighbouring agent within a communicative range of the updating agent;
estimate a first distance to the first neighbouring agent and a first direction to the first neighbouring agent;
determine a movement direction based on the first direction to the first neighbouring agent;
determine a movement magnitude based on an activation function, the first distance to the first neighbouring agent, and the desired reference distance, wherein:
the activation function is configured such that the greater the difference between the first distance to the neighbouring agent and a desired reference difference, the larger the movement magnitude; and
move the updating agent based on the movement direction and the movement magnitude.

12. The apparatus according to claim 11, wherein the activation function is configured to generate a movement magnitude of zero when a difference between the first distance to the neighbouring agent and the desired reference difference is less than a threshold.

13. The apparatus according to claim 11, further configured to:
identify a second neighbouring agent within the communicative range of the updating agent;
estimate a second distance to the second neighbouring agent and a second direction to the second neighbouring agent;
determine whether the first neighbouring agent and the second neighbouring agent are located within the desired reference distance of the updating agent; and
in response to determining that the first neighbouring agent is located within the desired reference distance of the updating agent and the second neighbouring agent is not located within the desired reference distance of the updating agent:
determine the movement direction based on only the first direction to the first neighbouring agent; and
determine the movement magnitude based on the activation function, the desired reference distance, and only the first distance to the first neighbouring agent.

14. The apparatus according to claim 13, wherein the apparatus is configured to:
determine the movement direction according to a sum of a direction vector to the first neighbouring agent and a direction vector to the second neighbouring agent;
determine a first movement magnitude based on the first distance to the neighbouring agent, the activation function and the desired reference distance;
determine a second movement magnitude based on the second distance to the second neighbouring agent, the activation function and the desired reference distance; and
determine the movement magnitude based on an average of the first movement magnitude and the second movement magnitude in response to determining that either:
the first neighbouring agent and the second neighbouring agent are located within the desired reference distance of the updating agent; or
the first neighbouring agent and the second neighbouring agent are the first neighbouring agent and the second neighbouring agent are not located within the desired reference distance of the updating agent.

15. The apparatus according to claim 11, wherein the apparatus is further configured to:
determine a communicative range of the updating agent based on a communication between the updating agent and the first neighbouring agent; and
set the desired reference distance less than the communicative range.

16. The apparatus according to claim 11 wherein the first neighbouring agent and the updating agent are robots.

17. A system comprising a decentralised multi-agent system deployed within an area, the system configured to:
update a position of an updating agent in the decentralised multi-agent system according claim 11;
determine a local area coverage for each agent in the decentralised multi-agent system;
determine whether full areal coverage is achieved by the decentralised multi-agent system based on the local area coverage performed by each agent in the decentralised multi-agent system; and
in response to determining that full areal coverage is not achieved by the decentralised multi-agent system:
deploy a further agent within the area to be part of the decentralised multi-agent system.

18. The system according to claim 17, wherein the system is further configured, when determining whether full areal coverage is achieved, to:
broadcast a query to the decentralised multi-agent system;
transmit, by each agent in the decentralised multi-agent system, an indication of whether each agent is locally perceiving a sufficient area; and
determine that full areal coverage is achieved in response to receiving an indication that each agent in the swarm is locally perceiving sufficient area wherein:
an agent is locally perceiving sufficient area if there are no blind spots in sensor coverage surrounding an area being perceived by the agent.

19. The system according to claim 18 wherein the system is further configured, when determining the local area coverage for each agent in the decentralised multi-agent system, to:
determine, by the updating agent, whether the updating agent has identified at least a predetermined number of neighbouring agents; and/or
determine, by the updating agent, whether the updating agent is within a predetermined distance of at least one obstacle.

20. The system according to claim 19 wherein the system is further configured, when determining the local area coverage for each agent in the decentralised multi-agent system, to:
divide an area surrounding the updating agent into a first sector and a second sector, wherein the first sector is associated with a first angular distance and the second sector is associated with a second angular distance; and
determine that the updating agent is locally perceiving sufficient area in response to determining that:
the first sector comprises:
 a second neighbouring agent; or
 a first obstacle that spans the first angular distance; and
the second sector comprises:
 a third neighbouring agent; or
 a second obstacle the spans the second angular distance.

\* \* \* \* \*